Patented Nov. 30, 1937

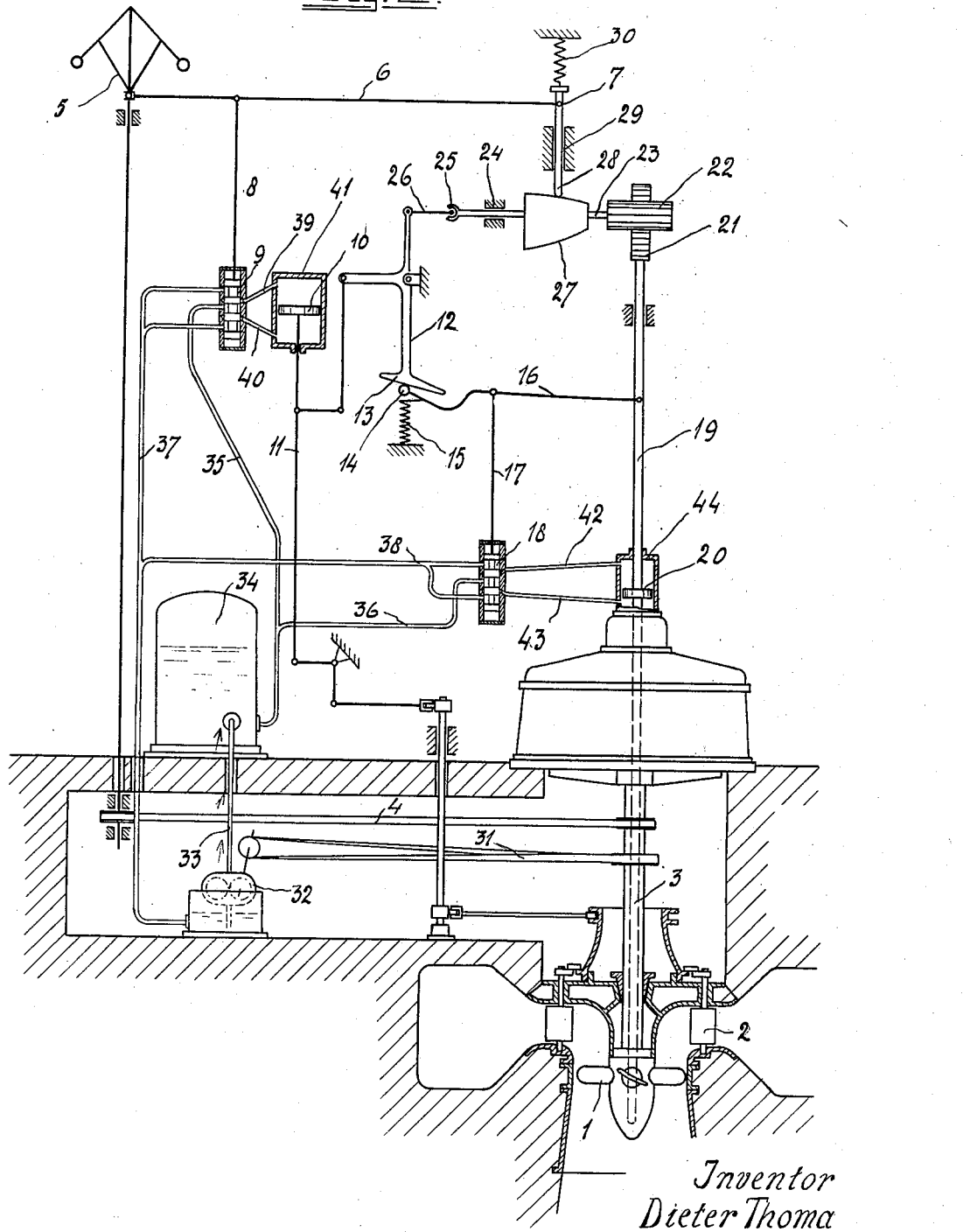

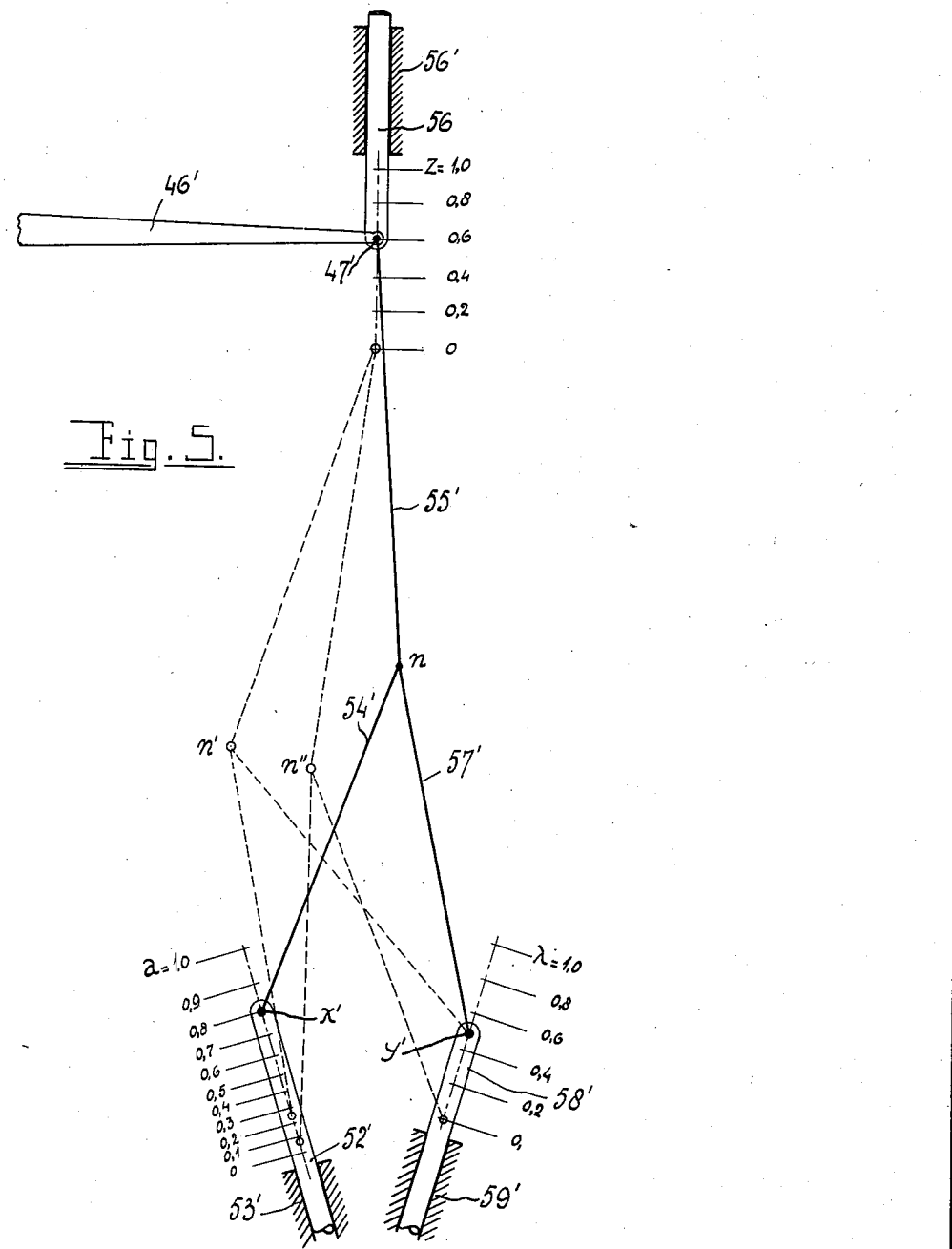

2,100,580

UNITED STATES PATENT OFFICE 2,100,580

DOUBLE GOVERNOR FOR TURBINES

Dieter Thoma, Munich, Germany

Application January 25, 1936, Serial No. 60,787
In Germany January 31, 1935

14 Claims. (Cl. 253—143)

This invention relates to turbines and more particularly to a double governor for Kaplan-turbines and the like.

It is an object of the present invention to provide for a favorable governing procedure after a sudden decrease in load during that period in which the control members deviate considerably from their correlated positions.

It is a further object of the invention to completely eliminate, during the second stage of the governing procedure, the influence of the closing of the runner blades onto the control of the speed of the turbine in a manner such that equilibrium, as far as the speed is concerned, can be attained already at the end of the first stage.

Other objects and the manner in which the same can be attained will appear from the following description.

In the drawings affixed to this specification and forming part thereof, several embodiments of the invention are illustrated diagrammatically by way of example.

In the drawings:

Fig. 2 is a diagrammatical elevation of a Kaplan-turbine provided with one embodiment of the double governor according to the invention;

Fig. 5 is a diagram of a detail of Fig. 4, and

Figure 1:
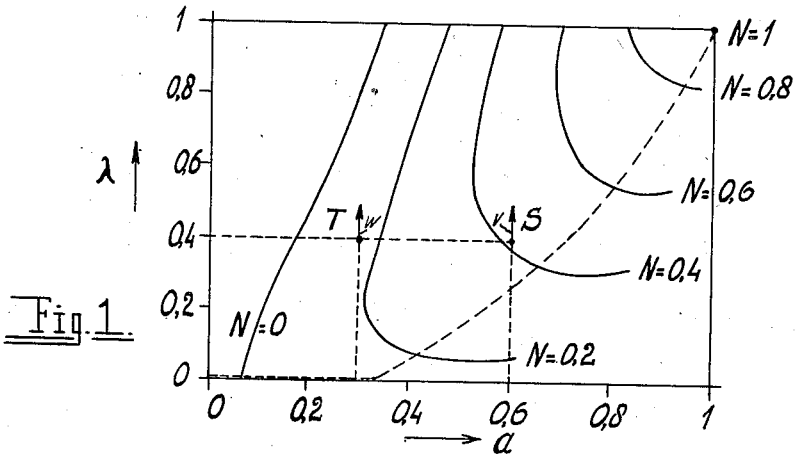
Fig. 1 is a diagrammatical showing of the output of a Kaplan-turbine.

Kaplan-turbines of the type controlled by an adjustment of the guide blades and runner vanes, which shall attain with all loads the highest possible efficiency, require that any position of the guide vanes is correlated with a predetermined position of the runner blades. Therefore, as is well known, the double governors of Kaplan-turbines are provided in a manner such that they bring, in the state of equilibrium, the guide blades and runner vanes into correlated positions. Governors are known which, after a sudden decrease in load on the turbine, cause temporarily a pronounced deviation from this correlation: the highest closing speed which the piston of the servomotor used for adjusting the runner blades (runner blade piston) can adopt is made intentionally considerably smaller than the highest closing speed of the power piston adjusting the guide vanes (guide vane piston). Thus after a decrease in load the equalization of output takes place first—in the first phase of the governing process—preponderantly by closing the guide blades, while the runner blades are closed only to a small extent ("closing" of the runner blades meaning the transition from the steep position correlated with the full opening of the guide vanes to the flat position corresponding to the smallest opening of the guide vanes). This deviation from the correlation during the equalization of output, required to take place quickly, after a decrease in load, is advantageous for the governing procedure. For the decrease of the efficiency reduces the amount, about which the discharge of the turbine must be decreased, and reduces correspondingly the obnoxious inertia effect in the water intake and the suction pipe. The output of the turbine once having been adjusted totally or approximately to the output required, in the second phase of the governing process the relatively slow closing movement of the runner blades exerts its influence. In order to maintain the output constant—i. e. equal to the output required—the guide vanes too must be readjusted. As is well known the guide vane piston and the runner blade piston are controlled in such a manner, that both finally attain correlated positions.

The present invention relates to several novel forms of governors and aims at as favorable as possible a governing process after a sudden decrease in load during the time, in which the two power pistons deviate considerably from their correlated positions.

In devices well known in the prior art customarily a centrifugal governor is attached to one end of the main floating lever (restoring lever), which actuates the valve of the guide vane servomotor, the piston of said servomotor being connected with the other end of the floating lever. In addition the guide vane piston is connected to one end of a secondary floating lever which actuates the valve of the runner blade servomotor, the piston of which is connected to the other end of the secondary floating lever, the arrangement being made in such way that by a displacement of the guide vane piston the runner blade piston is compelled to move until the correlated position is reached.

When a sudden decrease in load of the turbine occurs, i. e. when the load decreases suddenly starting from a state of equilibrium to a smaller amount, which then is maintained constant, this known governor operates in the following manner. In the first phase a quick equalization of output is effected by a speedy closing movement of the guide vane piston, induced by the displacement of the one end of the main floating lever effected by the centrifugal governor. The piston rod of this piston hereby adjusts the other end of the main floating lever. As the displacement of this point is decisive for the compensating action effected by the restoring mechanism, it shall be designated as "restoring point". The movement of the guide vane piston is transmitted to the secondary floating lever and starts a closing movement of the runner piston. Since the valve of the runner servomotor is so provided that the maximum closing speed of the piston is relatively small, the adjustment of the runner blades at first is not very noticeable so that in the first phase the governing process is determined chiefly by the adjustment of the guide vanes, taking place in a manner somewhat similar to that in which an ordinary turbine governor works.

In the second, more extended phase of the governing process the continuing closing movement of the guide vanes exerts its influence. It would be desirable that hereby the speed of the turbine as attained, at the end of the first phase, is not again altered. However, this wish cannot be fulfilled, for the closing of the runner blades with the guide vanes being stationary generally effects an alteration of the turbine output, so that the centrifugal governor again must intervene in order to balance the alteration. A closing movement of the guide vane piston will take place, and by this the restoring point will be displaced too. Therefore at the end of the second phase, when the state of equilibrium is finally reached, the restoring point will be in a position different from that reached at the end of the first phase, the speed having been changed correspondingly. In view of the fact that almost always it is required that the speed shall be stable, relatively soon after the alteration in load, one is prevented by the procedure described above from rendering the closing speed of the runner piston as small as would be required for suppressing, during the first phase, a noticeable effect of the closing of the runner blades and gaining the full benefit of the slow closing of the runner vanes.

With most of the known constructions of a governor of the kind described above, there is inserted, in the connection between the guide vane piston and the restoring point, a dash pot combined with a spring. The disadvantages of the procedure above referred to are somewhat reduced by such a secondary compensation, without, however, being removed altogether.

It is the purpose of the present invention to completely eliminate the influence of the closing movement of the runner piston onto the control of the speed of the turbine during the second phase of the governing process in a manner such that the speed will not change during the second phase, the ultimate speed of the turbine having been reached already at the end of the first phase. Hereby the governing of the pistons into the correlated positions, taking place during the second phase, becomes a private matter for the two pistons, occurring without any cooperation on the part of the centrifugal governor. Therefore, the closing speed of the runner piston can be rendered as small as desired without any disadvantage being encountered.

The prior art has suggested to eliminate the disadvantage referred to above—the alteration of the speed during the second phase—by connecting the restoring point with both the power pistons through an adding mechanism. In devices of this kind an additional floating lever is linked to the main floating lever at its end, the restoring point, the end points of said additional floating lever being connected with the guide blade and runner vane pistons respectively. The additional floating lever somehow adds a portion of the movement of the guide vane piston to a portion of the movement of the runner blade piston, the sum of those portions being transmitted onto the restoring point. The result desired, however, has not been obtained in this manner.

The prior art has further suggested constructions, which may be regarded as generalizations of the construction just referred to and which seem to render possible a farther-reaching adaptation to the output characteristics of the turbine. In devices of this kind the end points of the additional floating lever mentioned above are actuated by mechanisms which yield a varying ratio of transmission. Mechanisms of this kind may comprise two cam surfaces connected with the guide vane piston and runner blade piston, respectively, and rolls provided at the end points of the additional floating lever and pressed onto the cam surfaces by means of springs.

With constructions of this kind an optional function of the opening of the guide vanes is added to an optional function of the position of the runner blades, both functions being determined by the shape of the respective cam surface, their sum being transmitted onto the restoring point. This construction also does not permit in principle of obtaining the desired result as appears from the following consideration.

During the second phase of the governing process the output of the turbine is invariable. In order that it remains invariable without the cooperation of the centrifugal governor, i. e. with the speed being maintained stable, the restoring point must not alter its position. The position of the restoring point, therefore, must depend only on the turbine output, but must be independent from the manner by which this output is obtained, i. e. independent from the guide vane openings and runner blade positions taken apart.

The fact that it is not possible to fulfill this requirement by a suitable choice of the cam surfaces depends upon the following well known mathematical law. Where a function of two variables is given, e. g. $z=f(x, y)$ it is generally not possible to so determine a function solely of $x$, $\varphi(x)$ and a function solely of $y$, $\psi(y)$, that $\varphi(x)+\psi(y)=f(x,y)$. This is possible only in the particular case that the given function always follows the condition $$\frac{\delta^2 f}{\delta x \, \delta y}=0)$$

Calling, for the present case, the turbine output existing for a certain head and certain speed N, the opening of the guide vanes $a$, the angular position of the runner blades $\lambda$, then $N=f(a, \lambda)$ is given by the hydraulic characteristics of the turbine. The dependency of the output, actually existing with the Kaplan-turbines, on the opening of the guide vanes and the position of the runner blades does not permit of functions $\varphi(a)$ and $\psi(\lambda)$, which fulfill the requirement that $\varphi(a)+\psi(\lambda)$ gives the output of the turbine.

Fig. 1 shows the output of a Kaplan-turbine (which has been derived from Fig. 356 in the book by Thomann, Water Turbines, second part, second edition, Stuttgart 1931, page 259). In this figure the abscissae indicate the openings of the guide vanes in fractions of the complete opening, while the ordinates indicate the angular position of the runner blades, the angles of rotation (starting from their flattest position) being given in fractions of the largest angle. Each point of the diagram corresponds to a certain operating condition. The full lines are lines of equal output; the outputs, measured in fractions of the maximum output, are written on each line. The line shown in dashes is the line of correlation, indicating those operating conditions, which, with a given load, yield the highest efficiency. For the operation of the turbine after sudden decreases in load, the portion of the diagram lying above the line of correlation comes into consideration.

If the restoring point is connected with the two pistons in a manner such that its position depends solely upon the turbine output, any movement of the pistons effecting an increase of the turbine output, must be followed by a movement of the restoring point in the same sense, e. g. by an upward movement and every movement of the pistons effecting a reduction of the turbine output must be followed by a downward movement of the restoring point. When the turbine operates as indicated by the point S in Fig. 4 ($a=0.6$; $\lambda=0.4$) and the runner blades are displaced to a somewhat larger angle (corresponding to a displacement of the point of operation in the direction of the arrow $v$) the output increases as can be seen from the course of line $N=0.4$, the restoring point, therefore, being required to be raised. When the turbine operates with a smaller opening of the guide vane, but with the same position of the runner blades as indicated by the point T in Fig. 4 ($a=0.3$; $\lambda=0.4$) and the runner blades are displaced to a somewhat larger angle (corresponding to the arrow $w$), then the turbine output decreases, and the restoring point should be lowered. One cannot comply with this requirement by correspondingly selecting the shape of the cam surface employed in the prior art, without rendering incorrect the transmission of movement for the point of operation N, for in both cases the same part of the cam surface is active for the transmission of the movement of the runner blade piston to the additional floating lever.

The requirement, that the position of the restoring point depends solely upon the turbine output, cannot be fulfilled, in principle, by a transmission, the action of which possesses the character of an addition of two single movements, one of which depends solely upon the movement of the guide vanes, while the other depends solely upon the movement of the runner vanes. According to the present invention that requirement is complied with by providing for a connection of the two servomotor pistons with the restoring point such that the ratio of the transmission of movement from the runner piston to the restoring point (with the guide vane piston being maintained in position) depends from the position of the guide vane piston. When governing a turbine having an output characteristic such as shown in Fig. 1, the transmission ratio from the runner blade piston to the restoring point even must change the sign. Fig. 1 indeed relates solely to a particular turbine; however, the output characteristics of other Kaplan-turbines are also such that the transmission ratio runner blade piston=restoring point must be dependent upon the position of the guide vanes, if the position of the restoring point shall depend solely from the turbine output.

Fig. 2 shows one embodiment of the novel governor according to the present invention mounted on a Kaplan-turbine. In Fig. 2, 1 are the runner blades and 2 the guide vanes of a Kaplan-turbine. The hollow turbine shaft 3 drives, through connecting means 4, the centrifugal governor 5, to which the main floating lever 6 carrying the restoring point 7 is connected. The main floating lever 6 actuates, through connecting rod 8, the valve 9 for the guide vane servomotor with piston indicated at 10, the piston rod 11 of which is indirectly connected with the guide vanes 2 in a manner such that a downward movement of the piston effects the closing of the guide vanes. The piston rod 11 is linked to a bell crank lever 12 carrying a cam surface 13. A roll 14 is pressed, by a spring 15, onto the cam surface 13, which roll is mounted on one end of the secondary floating lever 16, which, through a connecting rod 17, is connected with the valve 18 of the runner blade servomotor, while the other end of lever 16 is connected to piston rod 19 of the runner blade piston 20. The runner blade piston is connected with the runner blades in such a manner that a downward movement of the piston effects the closing of the runner blades.

The upper portion of the piston rod 19 carries the rack 21, which meshes with a toothed wheel 22, the diameter of which is so chosen, that it makes less than a full revolution during a full stroke of the runner piston 20. The toothed wheel 22 is mounted on the shaft 23 which is arranged in bearings 24 so that it can be displaced in longitudinal direction. The longitudinal displacement of shaft 23 is effected by means of the ball joint 25, the link 26 from the bell crank lever 12 as may be seen from Fig. 2. The cam body 27 is rigidly mounted on shaft 23 and guides a stud 28 displaceably arranged in bearings 29. The stud 28 carries the restoring point 7, being linked to the main floating lever 6. A spring 30 is arranged for pressing the stud 28 onto the cam body 27. The turbine shaft 3 drives through connection 31 a gear pump indicated at 32 for furnishing the pressure oil. The oil is supplied, through piping 33, into an air chamber 34, from which it is supplied, through piping 35, to valve 9 and through piping 36 to valve 18, the exhaust pipes 37 from valve gear 9 and 38 from valve gear 18 being returned to the pump 32. Pipings 39 and 40 connect the valve 9 with the cylinder 41 of the guide vane piston 10, while pipes 42 and 43 connect the valve 18 to the cylinder 44 of the runner piston 20.

Any line perpendicular to the axis of the shaft 23 connecting a point of the surface of the cam body 27 with the axis of the shaft 23 shall be called a radius of the cam body. Since the angular position of the cam body is determined by the position of the runner blade piston and the longitudinal position of the cam body is determined by the position of the guide vane piston, there exists, for any combination of the position of the runner blades and the position of the guide vanes, a certain predetermined radius, which in turn determines the position of the restoring point. According to the invention, the cam body is so shaped that the lengths of the radii depend only upon the turbine output and vary steadily corresponding to the same, in the simplest case in a manner such that the length of the radii increases in proportion to the turbine output.

In the operation of the double governor according to Fig. 2 the influence of the closing movement of the runner vane piston on the control of the speed is completely eliminated in such a manner that as far as the number of revolutions is concerned equilibrium is obtained already at the end of the first phase. In the first phase of the governing process a fast equalization of output is effected by a speedy downward movement of the guide vane piston 10. This downward movement effects, through the bell crank lever 12, an axial displacement of the cam body 27 and simultaneously governs the valve gear 18 in a manner such as to start the closing movement of the runner piston 20. Since this piston is arranged for a relatively slow closing speed, the adjustment of the runner blades at first does not become very noticeable, so that the governing process is governed chiefly by the adjustment of the guide vanes.

In the second, more extended phase of the governing process the lasting closing movement of the runner blade piston leads to a noticeable change of the angular position of the cam body and the point 7 thereby is raised a little, just sufficiently far to induce, by raising the valve 9, a slow downward (closing) movement of the guide vane piston 10; this movement is checked by the ensuing longitudinal displacement of the cam body 27, by which the previous position of the point 7 is restored. However, there remains a change of the transmission ratio from piston 20 to the restoring point 7, since with the new longitudinal position of the cam body another circumferential line of the cam body becomes operative for the transmission of the movements of piston 20. The downward movement of the guide vane piston 10 and the changing of said transmission ratio will continue as long as the closing movement of the runner blade piston continues, i. e. until by the secondary floating lever 16 the valve 18 is returned to its normal position. As all movements are very slow during the second phase, the deviations of the valve 9 from its normal position will be very small, and the middle point of the main floating lever 6, to which the rod 8 is linked, will approximately retain its normal position. On the other hand the power output of the turbine during the second phase is very nearly constant (with this governor as well as with governors of the usual type), since the load is constant and the turbine is under perfect control of the centrifugal governor. As with the new governor the position of the restoring point 7 depends solely upon the output, during the second phase this point will always be in approximately the same position. Now it has been shown that two points of the main floating lever approximately retain their positions, and it is apparent that the left end point of this lever which is attached to the collar of the centrifugal governor, must also approximately retain its position. This shows that during the second phase no cooperation on the part of the centrifugal governor is required and that the speed is maintained constant.

Instead of the double governor shown in Fig. 2 comprising a cam body and a toothed wheel arrangement, transmissions from the runner and guide pistons may be used which consist merely of levers, links and straight line guides. In this case the requirement referred to above, i. e. that the position of the restoring point be dependent solely upon the turbine output, can be complied with only approximately. Transmissions, which, for a given field of output, comply with that requirement sufficiently accurately, can be found by trying out different arrangements on the drawing board.

Figure 3:
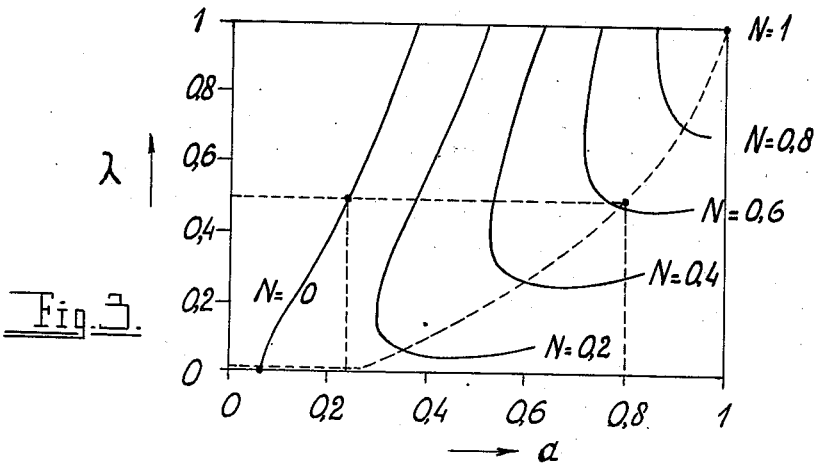
Fig. 3 is a diagrammatical showing of the output of another Kaplan-turbine.
Figure 4:
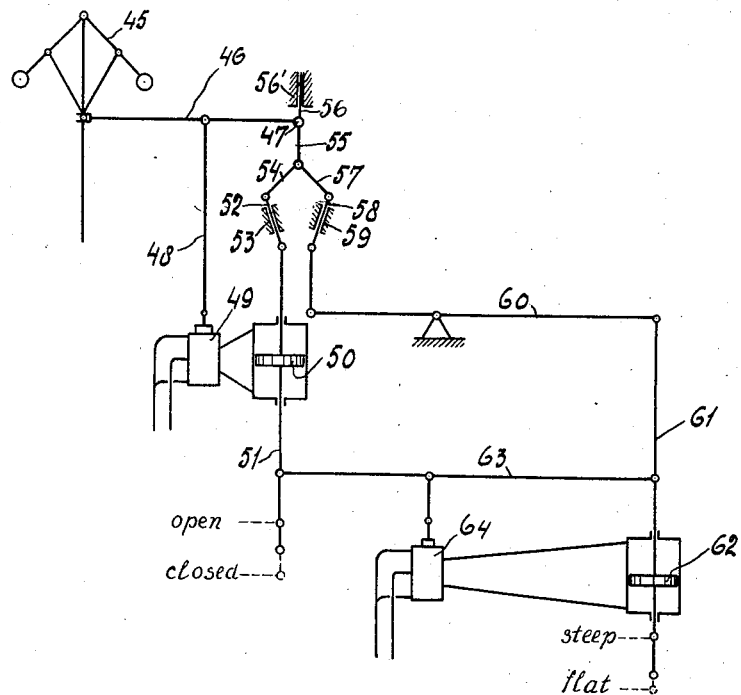
Fig. 4 is a diagrammatical showing of another embodiment of the invention.

Fig. 3 illustrates diagrammatically the output of a turbine, which may be provided with a transmission according to Fig. 4. Fig. 4 shows diagrammatically a transmission which, apart from the straight line guides used for the two incoming movements and the outgoing movement, consists of three links only. In Fig. 4 45 is the centrifugal governor, 46 the main floating lever, 47 the restoring point. The connecting rod 48 connects the main floating lever with the valve 49 of the guide vane piston 50, the piston rod 51 of which is connected with the guide vanes according to the legend. The upper portion of the piston rod 51 is linked to the rod 52 guided in a bearing 53, a link 54 and a link 55 connecting the rod 52 with the restoring point 47, which by the rod 56 is guided in bearing 56'. To the links 54 and 55 the link 57 is linked, which in turn is linked to a rod 58 guided in bearing 59 and connected through a lever 60 with the piston rod 61 of the runner blade piston 62 connected with the runner blades according to the legend. The secondary floating lever 63 connects piston rod 61 to the valve 64 of the runner piston.

In order to follow up more closely the correlation of the several parts of the transmission shown in Fig. 4, Fig. 5 illustrates in detail the conditions of the transmission. In Fig. 5, 52' is the rod guided in bearing 53' and correlated with the guide vane piston (not shown). 54' is the link connecting, at the point $n$, 52' to link 55', which is also connected through link 57', to the rod 58' guided in bearing 59' and connected to the runner piston (not shown). 46' is the restoring lever, which is guided by the rod 56 sliding in bearing 56'.

The point, in which the link 54' is linked to the rod 52' may be called $x^1$. Fig. 5 illustrates the various positions, which the point $x^1$ may have on its dashed line of travel for varying openings $a$ of the guide vanes. In the position of $x^1$ shown in Fig. 5, $a=0.8$. The point, in which the link 57' is linked to the rod 59' may be called $y^1$. The positions which the point $y^1$ may have on its dashed line of travel for varying angular positions $\lambda$ of the runner blades, are shown in Fig. 5, in which the distance travelled by point $y^1$ has been made proportional to $\lambda$. In the position shown in Fig. 5 $\lambda=0.5$.

The upper end of the link 55' is linked, at the restoring point 47', to the rod 56, which may be displaced in parallel direction in the bearing 56', thus guiding the restoring point 47' along the dashed line shown in Fig. 5. The position $z$ of the restoring point 47' shall be measured according to the scale illustrated in Fig. 3, which has an even subdivision; the scale is so arranged that for the turbine running steady with no load—whereby, according to Fig. 4, $a=0.06$ and $\lambda=0$—$z=0$ and for maximum output ($a=1$ and $\lambda=1$) $z=1$. In the position shown in Fig. 5, $z=0.61$.

The operation of the transmission shown in Figs. 4 and 5 is as follows: the point of operation corresponding to the position illustrated in Fig. 5 ($a=0.8$; $\lambda=0.5$) is shown in the diagram Fig. 3, lying on the line of correlation shown in dashes in Fig. 3 and corresponding to a state of equilibrium for the output $N=0.61$. If the turbine, starting from this condition, suddenly is completely relieved from load, it operates at the end of the first phase (if one disregards the slight closing movement of the runner blades already taking place during the first phase) in the point of operation $a=0.24$; $\lambda=0.5$ likewise shown in Fig. 3. The corresponding position of the transmission is illustrated in dashed lines in Fig. 5: the point in which the three links 54', 55' and 57' connect, herewith has the position indicated at $n'$, the position of the restoring point being $z=0$. At the end of the second phase the turbine operates at the point of operation $a=0.06$; $\lambda=0$; the corresponding position of the transmission is likewise shown in dashed lines in Fig. 5, the point in which the three links connect having the position indicated at $n''$, while the position of the return point is unaltered, i. e. $z=0$.

In the position of the transmission shown for $a=0.8$; $\lambda=0.5$, the transmission ratio, with which, with the guide vane piston being maintained in position, an adjustment of the runner blade piston is transmitted onto the restoring point, is positive: Fig. 5 illustrates that with point $x^1$ being maintained a displacement of the point $y^1$ in the sense of an increasing $\lambda$ effects an increase of $z$. In the position shown in dashes with $a=0.24$; $\lambda=0.5$ (point $n'$) the transmission ratio is negative, for here the point $y^1$ must be displaced in the sense of a decreasing $\lambda$ in order to effect, with $x^1$ being stationary, an increase of $z$.

Figure 6:
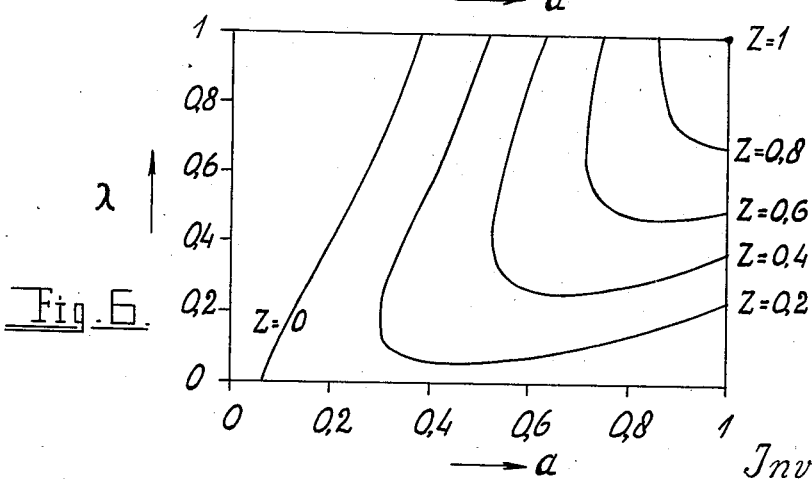
Fig. 6 is a diagram showing the output of a Kaplan-turbine with particular reference to the embodiment of the invention shown in Figs. 4 and 5.

In order to render possible a more accurate investigation of the cinematic conditions of the transmission, the manner in which, with a transmission according to Fig. 5, $z$ depends on $a$ and $\lambda$, is illustrated in Fig. 6, wherein the field $a$ and $\lambda$ lines for constant values of $z$ are shown. A comparison of the Figs. 3 and 6 shows that in Fig. 6 the lines $z=$const. correspond even better than would appear to be necessary, to the lines $N=$const. in Fig. 3. The transmission shown in Figs. 4 and 5, therefore, does not only comply with the requirement—the fulfilment of which would be sufficient for the purposes of the present invention—that the position of the restoring point depends solely upon the turbine output and is independent from the manner in which this output is obtained, but moreover the transmission permits of an arrangement such that the distance travelled by the restoring point is rendered proportional to the output.

Numerous advantages are attained with double governors according to the present invention. The governing process after a sudden decrease of load during that period, in which the two servomotor pistons considerably deviate from their correlated positions, is rendered particularly favorable. During the second phase of the governing process the influence of the closing movement of the runner piston on the control of the speed is completely eliminated, so that, regarding the speed, an equilibrium is obtained already at the end of the first phase. Hereby the governing of the pistons into their correlated positions becomes a private matter for the two power pistons, which takes place without the cooperation of the centrifugal governor, permitting of adjusting the closing speed of the runner piston as small as desired without any disadvantages being encountered.

Various changes may be made in the details disclosed in the foregoing specification without departing from the invention or sacrificing the advantages thereof.

I claim:—

1. A turbine of the kind in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said turbine comprising in combination an adjustable runner blade mechanism, an adjustable guide vane mechanism associated therewith, a control member operatively connected with said runner mechanism, another control member operatively connected with said guide mechanism, means responsive to speed changes such as a centrifugal governor, means associated with said governor for actuating at least one of said control members, a restoring mechanism operatively connecting said latter means with said governor, and a transmission arranged to be influenced by both said control members and adapted to influence said restoring mechanism so as to maintain constant the speed of the turbine during the second phase of the governing process.

2. A turbine of the kind in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said turbine comprising in combination an adjustable runner mechanism, an adjustable guide mechanism associated therewith, a control member operatively connected with said runner mechanism, another control member operatively connected with said guide mechanism, means responsive to speed changes such as a centrifugal governor, means associated with said governor for actuating at least one of said control members, a restoring mechanism operatively connecting said latter means with said governor, and a transmission comprising a body adapted to be displaced in one direction by one of said control members, and in a different direction by the other control member, and a member adapted to coact therewith, said transmission being adapted to influence said restoring mechanism so as to maintain constant the speed during the second phase of the governing process.

3. A turbine of the kind in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said turbine comprising in combination an adjustable runner mechanism, an adjustable guide mechanism associated therewith, a control member operatively connected with said runner mechanism, another control member operatively connected with said guide mechanism, means responsive to speed changes such as a centrifugal governor, means associated with said governor for actuating at least one of said control members, a restoring mechanism operatively connecting said latter means with said governor, and a cam body arranged to be axially displaced by one of said control members, and to be rotated by the other member, and means guided by said cam body adapted to influence said restoring mechanism so as to maintain constant the speed during the second phase of the governing process.

4. A turbine of the kind in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said turbine comprising in combination an adjustable runner mechanism, an adjustable guide mechanism associated therewith, a control member operatively connected with said runner mechanism, another control member operatively connected with said guide mechanism, means responsive to speed changes such as a centrifugal governor, means associated with said governor for actuating at least one of said control members, a restoring mechanism operatively connecting said latter means with said governor, and a transmission comprising a plurality of links partly adapted to be influenced by said control members and partly adapted to influence said restoring mechanism so as to maintain constant the number of revolutions during the second phase of the governing process.

5. A turbine of the kind in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said turbine comprising in combination an adjustable runner mechanism, an adjustable guide mechanism associated therewith, a control member operatively connected with said runner mechanism, another control member operatively connected with said guide mechanism, means responsive to speed changes such as a centrifugal governor, means associated with said governor for actuating at least one of said control members, a restoring mechanism operatively connecting said latter means with said governor, and a transmission comprising three links operatively connected with each other, two of said links being adapted to be influenced by one of said control members, the remaining link being adapted to influence said restoring mechanism so as to maintain constant the number of revolutions during the second phase of the governing process.

6. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission arranged for transmitting a restoring movement from both the said pistons onto said restoring mechanism, said transmission being provided to adjust, in dependency upon the position of the guide control piston, the transmission ratio employed for transmitting, with said guide control piston being retained, a movement of the runner control piston onto said restoring mechanism.

7. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission arranged for transmitting a restoring movement from both the said pistons onto said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that at least in a portion of the range of stroke of the runner control piston the transmission ratio with small openings of the guide vane is smaller than with large openings of the guide vanes.

8. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission arranged for transmitting a restoring movement from both the said pistons onto said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that in at least a portion of the range of stroke of the runner control piston the transmission ratio with small openings of the guide vanes possesses a different sign than with large openings of the guide vanes.

9. Double-governor for turbines of the kind having adjustable runner and guide mechanisms, and in which the equalization of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission comprising a cam body arranged to be axially displaced by one of said control members and to be rotated by the other member and means guided by said cam body adapted to influence said restoring mechanism, said transmission being provided to adjust, in dependency upon the position of the guide control piston, the transmission ratio employed for transmitting, with said guide control piston being retained, a movement of the runner control piston onto said restoring mechanism.

10. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission comprising a plurality of links partly adapted to be influenced by said control members and partly adapted to influence said restoring mechanism, said transmission being provided to adjust, in dependency upon the position of the guide control piston, the transmission ratio employed for transmitting, with said guide control piston being retained, a movement of the runner control piston onto said restoring mechanism.

11. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission comprising a cam body arranged to be axially displaced by one of said control members and to be rotated by the other member and means guided by said cam body adapted to influence said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that at least in a portion of the range of stroke of the runner control piston the transmission ratio with small openings of the guide vane is smaller than with large openings of the guide vanes.

12. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination, a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission comprising a plurality of links partly adapted to be influenced by said control members and partly adapted to influence said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that at least in a portion of the range of stroke of the runner control piston the transmission ratio with small openings of the guide vane is smaller than with large openings of the guide vanes.

13. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor, and a transmission comprising a cam body arranged to be axially displaced by one of said control members and to be rotated by the other member and means guided by said cam body adapted to influence said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that in at least a portion of the range of stroke of the runner control piston the transmission ratio with small openings of the guide vanes possesses a different sign than with large openings of the guide vanes.

14. Double-governor for turbines of the kind having adjustable runner and guide mechanisms, and in which the equalization of load after a decrease of load is effected, during the first phase of the governing process, preponderantly by closing the guide vanes, while the runner blades are closed only to a small extent, and during the second phase of the governing process, by closing the runner blades and readjusting the guide vanes correspondingly, and vice versa, said double governor comprising in combination a servomotor piston for controlling said runner mechanism, a servomotor piston for controlling said guide mechanism, means responsive to speed changes such as a centrifugal governor for actuating at least one of said servomotor pistons, a restoring mechanism operatively connecting said latter means with said governor and a transmission comprising a plurality of links partly adapted to be influenced by said control members and partly adapted to influence said restoring mechanism, said transmission being provided to adjust, in dependency upon the position of the guide control piston, the transmission ratio employed for transmitting, with said guide control piston being retained, a movement of the runner control piston onto said restoring mechanism, in a manner such that in at least a portion of the range of stroke of the runner control piston the transmission ratio with small openings of the guide vanes possesses a different sign than with large openings of the guide vanes.

DIETER THOMA.